US012670393B1

(12) United States Patent
Chilkunda et al.

(10) Patent No.: US 12,670,393 B1
(45) Date of Patent: Jun. 30, 2026

(54) SPARSIFYING LAYERS OF NEURAL NETWORK MODELS TO DIFFERENT LEVELS

(71) Applicant: Ambarella International LP, Santa Clara, CA (US)

(72) Inventors: Santosh Chilkunda, Santa Clara, CA (US); Malhar Palkar, Cupertino, CA (US); Tong Yu, New York, NY (US)

(73) Assignee: Ambarella International LP, Santa Clara, CA (US)

( * ) Notice: Subject to any disclaimer, the term of this patent is extended or adjusted under 35 U.S.C. 154(b) by 415 days.

(21) Appl. No.: 16/779,905

(22) Filed: Feb. 3, 2020

(51) Int. Cl.
*G06N 3/082* (2023.01)
*G06N 7/08* (2006.01)
*G06N 20/10* (2019.01)

(52) U.S. Cl.
CPC ............... *G06N 3/082* (2013.01); *G06N 7/08* (2013.01); *G06N 20/10* (2019.01)

(58) Field of Classification Search
CPC ........... G06N 3/082; G06N 20/10; G06N 7/08
See application file for complete search history.

(56) References Cited

U.S. PATENT DOCUMENTS

2018/0181857 A1 * 6/2018 Mathew ................... G06F 17/15
2019/0362235 A1 * 11/2019 Xu ............................ G06N 3/04

OTHER PUBLICATIONS

Rizvi, S.T.H.; Patti, D.; Björklund, T.; Cabodi, G.; Francini, G. Deep Classifiers-Based License Plate Detection, Localization and Recognition on GPU-Powered Mobile Platform. Future Internet 2017, 9, 66. https://doi.org/10.3390/fi9040066 (Year: 2017).*

Fedorov et al. "SpArSe: Sparse Architecture Search for CNNs on Resource-Constrained Microcontrollers" arXiv [published 2019] [retrieved Mar. 2022] <URL: https://arxiv.org/abs/1905.12107> (Year: 2019).*

Tan et al. "MnasNet: Platform-Aware Neural Architecture Search for Mobile." arXiv. [Published 2019] [Retrieved Mar. 2022] <URL: https://arxiv.org/abs/1807.11626> (Year: 2019).*

Kim et al. "Fine-Grained Neural Architecture Search". arXiv. [Published 2019] [Retrieved Mar. 2022] <URL: https://arxiv.org/abs/1911.07478> (Year: 2019).*

Veniat et al. "Learning Time/Memory-Efficient Deep Architectures with Budgeted Super Networks." arXiv [Published 2018] [retrieved Mar. 2022] <URL: https://arxiv.org/abs/1706.00046> (Year: 2018).*

(Continued)

*Primary Examiner* — David Yi
*Assistant Examiner* — Amy Tran
(74) *Attorney, Agent, or Firm* — Maiorana Patent Law, PA

(57) ABSTRACT

A method of pruning a pre-trained model comprises the steps of (a) constructing a stochastic super net and (b) training the stochastic super net to determine a particular candidate block selection that provides an optimal level of sparsity for each of the layers based upon a cost function. The stochastic super net generally represents a layer-wise search space with a fixed macro-architecture. A number of layers of the macro-architecture and input/output dimensions of each of the layers of the macro-architecture are essentially the same as the pre-trained model. Each layer comprises a plurality of candidate blocks. A sparsity of each of the candidate blocks in a respective layer is different. A training dataset used to train the pre-trained model is used to train the stochastic super net.

20 Claims, 8 Drawing Sheets

(56)                    References Cited

OTHER PUBLICATIONS

Lemaire et al. "Structured Pruning of Neural Network with Budget-Aware Regularization" openaccess [published 2019] [retrieved Mar. 2022] <URL: https://openaccess.thecvf.com/content_CVPR_2019/html/Lemaire_Structured_Pruning_of_Neural_Networks_With_Budget-Aware_Regularization_CVPR_2019_paper.html> (Year: 2019).*
Cai et al. "ProxylessNAS: Direct Neural Architecture Search on Target Task and Hardware" arXiv [published 2019] [retrieved Mar. 2022] <URL: https://arxiv.org/abs/1812.00332> (Year: 2019).*
Lim, Heechul et al. "CNAS: Channel-Level Neural Architecture Search" Open Review [Published 2019] [Retrieved 2022] <URL: https://openreview.net/forum?id=rklfleSFwS> (Year: 2019).*
Fang, Muyuan, et al. "BETANas: Balanced Training and Selective Drop for Neural Architecture Search" [Published 2019] [Retrieved 2022] <URL:https://arxiv.org/abs/1912.11191> (Year: 2019).*
R. Zhao and W. Luk, "Efficient Structured Pruning and Architecture Searching for Group Convolution," 2019 IEEE/CVF International Conference on Computer Vision Workshop (ICCVW), 2019, pp. 1961-1970, doi: 10.1109/ICCVW.2019.00245. (Year: 2019).*
Mei, Jieru et al. "AtomNAS: Fine-Grained End-to-End Neural Architecture Search" ICLR 2020 (preprint version 1) [Published Dec. 2019] [Retrieved Apr. 2023] <URL: https://doi.org/10.48550/arXiv.1912.09640> (Year: 2019).*
Authors: Wu et al Title: Mixed Precision Quantization of Convnets Via Differentiable Neural Architecture Search Date: Nov. 30, 2018 (Year: 2018).*
Authors: Wu (2) et al. Title: FBNet: Hardware-Aware Efficient ConvNet Design via Differentiable Neural Architecture Search Date: May 24, 2019 (Year: 2019).*
Authors: Liu et al Title: Learning Efficient Convolutional Networks through Network Slimming Date: Aug. 22, 2017 (Year: 2017).*
Authors: Liu (2) et al Title: Sparse Convolutional Neural Networks Date: 2015 (Year: 2015).*
Wu, Bichen, et al., "FBNet: Hardware-Aware Efficient ConvNet Design via Differentiable Neural Architecture Search", arXiv:1812.03443v3 [cs.CV] May 24, 2019, 10 pages.

* cited by examiner

ACCESS CONTROL CAMERAS 76

ATM CAMERAS 78

VEHICLE CAMERAS 74

BULLET CAMERAS 80

TRAFFIC CAMERAS 72

DOME CAMERAS 82

ANPR CAMERAS 70

<u>FIG. 1</u>

INDOOR CAMERAS

OUTDOOR CAMERAS

DOORBELL CAMERAS

BATTERY-POWERED CAMERAS

300

302

310

PROCESSOR

312

MEM

314

DISPLAY

316

USER INTERFACE

306

API

304

200

PROG

SPARSIFYING LAYERS OF NEURAL NETWORK MODELS TO DIFFERENT LEVELS

FIELD OF THE INVENTION

The invention relates to neural network generation generally and, more particularly, to a method and/or apparatus for sparsifying layers of neural network models to different levels.

BACKGROUND

A neural network, more properly referred to as an "artificial" neural network (ANN), is a computing system made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network can have hundreds or thousands of processing units.

Neural networks are typically organized in layers. The layers can comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented. Application of neural networks can require large amounts of memory and computations.

Model compression involves techniques to reduce the memory footprint and the amount of computations needed for a neural network. Model compression helps in improving performance on edge devices without significant loss of accuracy. Typical methods for compressing a model include pruning and quantization. Pruning is the process of reducing the model size by removing the least important coefficients. Pruning can be broadly classified into structured pruning and sparsification. In structured pruning, an entire kernel is removed when the kernel is deemed unimportant. In sparsification, only some of the coefficients in each kernel are removed (set to 0). Not all hardware architectures can exploit sparsification efficiently.

Generally, a fully-trained model is used as the starting point. The model is expected to be fully dense (0 sparsity). Pruning can be one-shot. In one-shot pruning, the kernels are pruned to certain target sparsity and trained. The target sparsity is maintained during training, i.e., the coefficients are not allowed to grow back once they are set to 0. Convergence can be a problem in one-shot pruning, especially for large sparsification. Iterative pruning solves the convergence problem. In iterative pruning, the target sparsity is achieved in multiple steps. Starting from a sparsity of 0.0, the sparsity of each layer is increased in discrete steps until one of two conditions is reached: target sparsity is reached or validation set accuracy is below a certain threshold. Although some layers can be sparsified more than others, iterative pruning does not provide that flexibility.

It would be desirable to implement a method and/or apparatus for sparsifying layers of neural network models to different levels.

SUMMARY

The invention concerns a method of pruning a pre-trained model comprising the steps of (a) constructing a stochastic super net and (b) training the stochastic super net to determine a particular candidate block selection that provides an optimal level of sparsity for each of the layers based upon a cost function. The stochastic super net generally represents a layer-wise search space with a fixed macro-architecture. A number of layers of the macro-architecture and input/output dimensions of each of the layers of the macro-architecture are essentially the same as the pre-trained model. Each layer comprises a plurality of candidate blocks. A sparsity of each of the candidate blocks in a respective layer is different. A training dataset used to train the pre-trained model is used to train the stochastic super net.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a method of sparsifying layers of neural network models to different levels that may (i) start from a pre-trained model, (ii) utilize a layer-wise search space with a fixed macro-architecture, (iii) reduce a memory footprint of a neural network, (iv) reduce the amount of computations needing to be performed by an edge device utilizing a neural network, (v) provide flexibility to sparsify different layers of a neural network to different levels, (vi) utilize a cost function modified to include a latency term to take into account performance on a particular edge device, and/or (vii) allow application of neural networks at edge devices not connected to the cloud.

Figure 1:
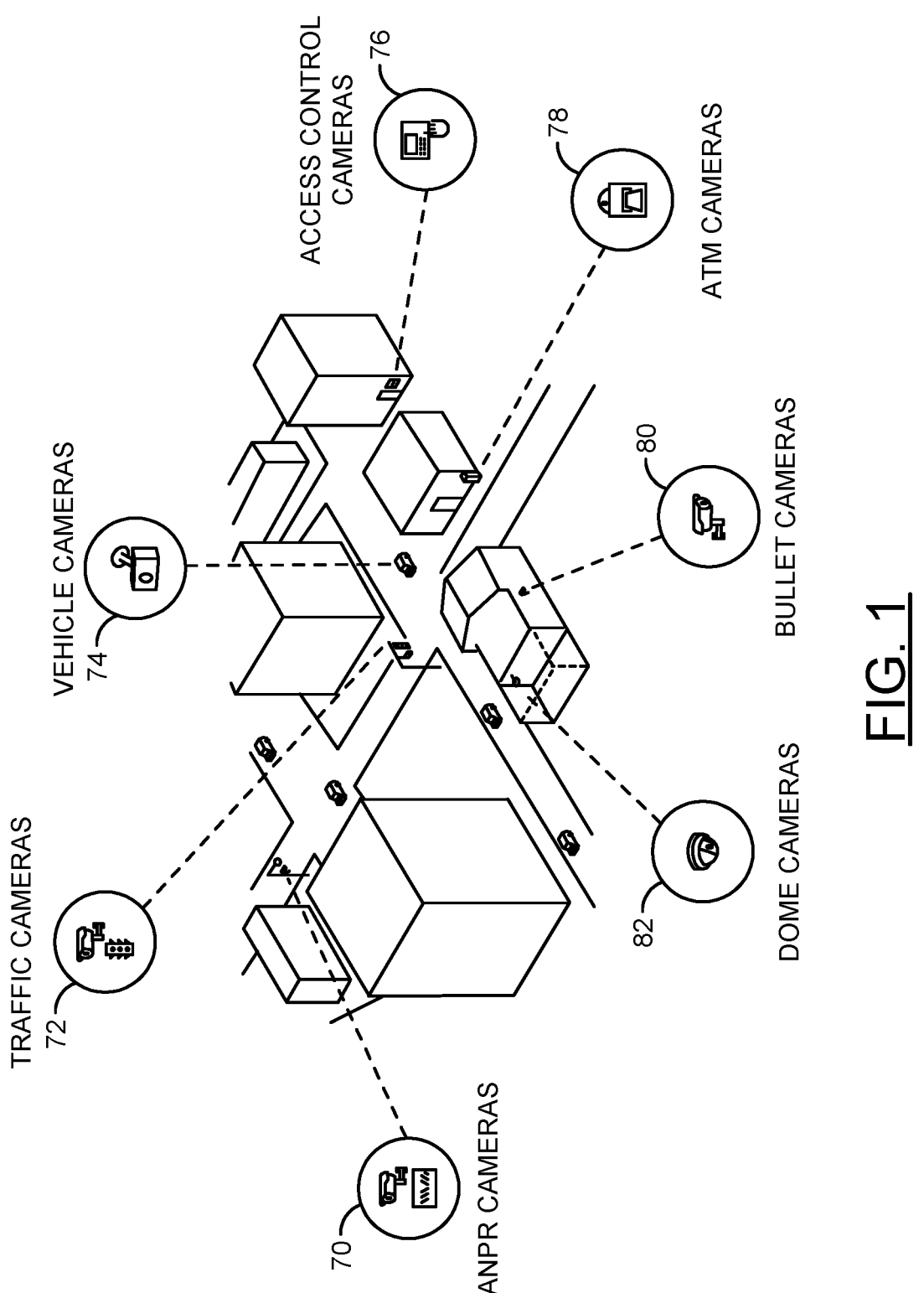
FIG. 1 is a diagram illustrating examples of edge devices that may utilize a sparsified neural network generated in accordance with example embodiments of the invention.

Referring to FIG. 1, a diagram is shown illustrating examples of edge devices that may utilize a sparsified neural network generated in accordance with example embodiments of the invention. In an example, edge devices may include low power technology designed to be deployed in embedded platforms at the edge of a network (e.g., micro-processors running on sensors, cameras, or other battery-powered devices), where power consumption is a critical concern. In an example, edge devices may comprise traffic cameras and intelligent transportation systems (ITS) solutions including automated number plate recognition (ANPR) cameras 70, traffic cameras 72, vehicle cameras 74, access control cameras 76, automatic teller machine (ATM) cameras 78, bullet cameras 80, and dome cameras 82. In an example, the traffic cameras and intelligent transportation systems (ITS) solutions may be designed to enhance roadway security with a combination of person and vehicle detection, vehicle make/model recognition, and automatic number plate recognition (ANPR) capabilities. In an example, person and vehicle detection, vehicle make/model recognition, and automatic number plate recognition (ANPR) capabilities may be facilitated utilizing sparsified neural network technology in accordance with embodiments of the invention.

Figure 2:
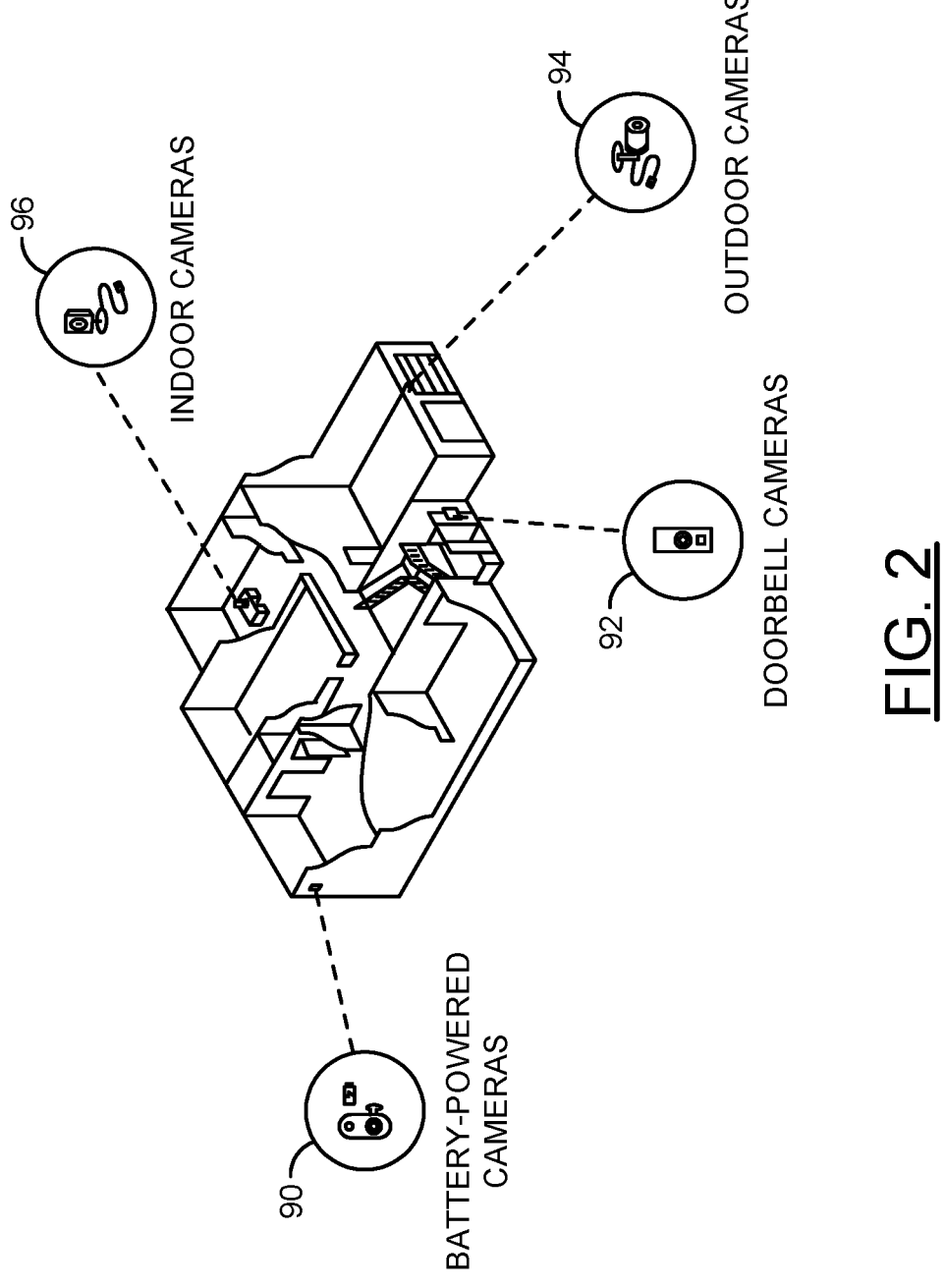
FIG. 2 is a diagram illustrating additional examples of edge devices that may utilize a sparsified neural network generated in accordance with example embodiments of the invention.

Referring to FIG. 2, a diagram is shown illustrating additional examples of edge devices that may utilize a sparsified neural network generated in accordance with example embodiments of the invention. In an example, edge devices may comprise security camera applications. In an example, the security camera applications may include battery-powered cameras 90, doorbell cameras 92, outdoor cameras 94, and indoor cameras 96. In an example, the security camera application edge devices may include low power technology designed to be deployed in embedded platforms at the edge (e.g., microprocessors/controllers running on battery-powered devices), where power consumption is a critical concern. The security camera applications may realize performance benefits from application of sparsified neural network technology in accordance with embodiments of the invention. In an example, an edge device utilizing a sparsified neural network generated in accordance with an embodiment of the invention may take massive amounts of image data and make on-device inferences to obtain useful information with reduced bandwidth and/or reduced power consumption.

Figure 3:
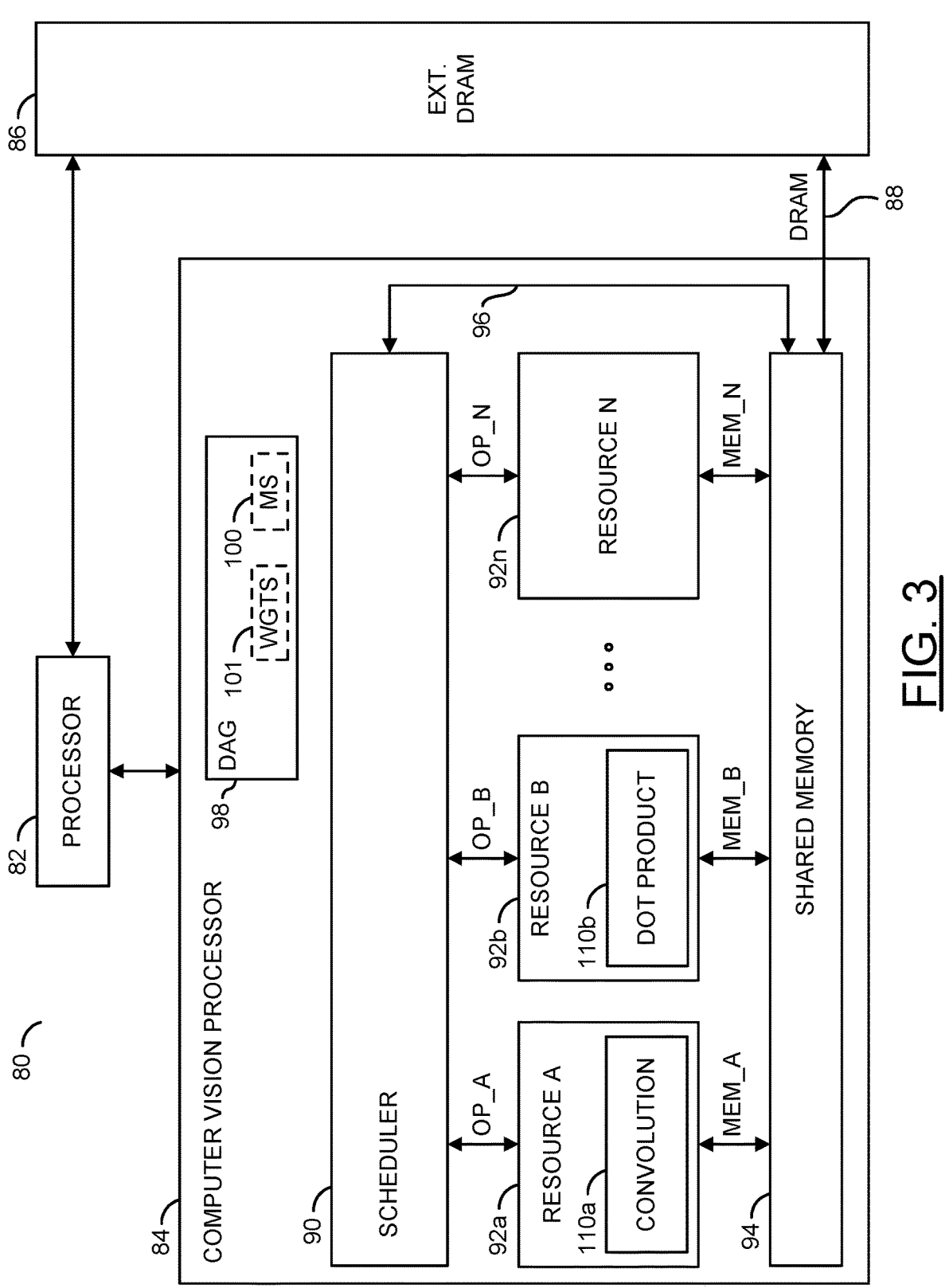
FIG. 3 is a diagram illustrating a system in which a sparsified neural network generated in accordance with example embodiments of the invention may be utilized.

Referring to FIG. 3, a diagram is shown illustrating a system 80 in which a sparsified neural network generated in accordance with an embodiment of the invention may be utilized. In an example, the system (or apparatus) 80 may be implemented as part of a computer vision system. In various embodiments, the system 80 may be implemented in an edge device. In an example, the system 80 may be implemented as part of a sensor, a camera, a computer, a server (e.g., a cloud server), a smart phone (e.g., a cellular telephone), a personal digital assistant, etc. The system 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the system 80 generally comprises hardware circuitry that is optimized to provide a high performance image processing and computer vision pipeline in minimal area and with minimal power consumption. In an example, various operations used to perform image processing, feature detection/extraction, and/or object detection for computer (or machine) vision may be implemented using hardware modules designed to reduce computational complexity and use resources efficiently.

In an example embodiment, the system 80 generally comprises a block (or circuit) 82, a block (or circuit) 84, a block (or circuit) 86, and/or a memory bus 88. The circuit 82 may implement a first processor. The circuit 84 may implement a second processor. The circuit 86 may implement an external memory (e.g., a memory external to the circuits 82 and 84). In an example, the circuit 84 may implement a computer vision processor. In an example, the processor 84 may be an intelligent vision processor. The system 80 may comprise other components (not shown). The number, type and/or arrangement of the components of the system 80 may be varied according to the design criteria of a particular implementation.

The circuit 82 may implement a processor circuit. In some embodiments, the processor circuit 82 may be a general purpose processor circuit. The processor circuit 82 may be operational to interact with the circuit 84 and the circuit 86 to perform various processing tasks. In an example, the processor 82 may be configured as a controller for the circuit 84. The processor 82 may be configured to execute computer readable instructions. In one example, the computer readable instructions may be stored by the circuit 86. In some embodiments, the computer readable instructions may comprise controller operations. The processor 82 may be configured to communicate with the circuit 84 and/or access results generated by components of the circuit 84. In an example, the processor 82 may be configured to utilize the circuit 84 to perform operations associated with a preprocessing network and/or a neural network model. In another example, the processor 82 may be configured to program the circuit 84 with a sparsified neural network model (MS) 100 and weights (WGTS) 101 generated using a process in accordance with an example embodiment of the invention. In an example, the neural network model 100 may be a sparsified neural network model (MS) configured for operation in an edge device. The MS 100 may be configured (e.g., trained) to optimize the computation demands and power consumption related to the system 80. The operations performed by the processor 82 may be varied according to the design criteria of a particular implementation.

In various embodiments, the circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the processor circuit 84.

The circuit 84 may implement a computer vision processor circuit. In an example, the circuit 84 may be configured to implement various functionality used for computer vision. The processor circuit 84 is generally operational to perform specific processing tasks as arranged by the processor circuit 82. In various embodiments, the processor 84 may be implemented solely in hardware. The processor 84 may directly execute a data flow directed to execution of the sparsified neural network model (MS) 100, and generated by software (e.g., a directed acyclic graph, etc.) that specifies processing (e.g., computer vision) tasks. In some embodiments, the circuit 84 may be a representative example of numerous computer vision processors implemented by the system 80 and configured to operate together.

The circuit 84 generally comprises a block (or circuit) 90, one or more blocks (or circuits) 92a-92n, a block (or circuit) 94, a path 96, and a block (or circuit) 98. The block 90 may implement a scheduler circuit. The blocks 92a-92n may implement hardware resources (or engines). The block 94 may implement a shared memory circuit. The block 98 may implement a directed acyclic graph (DAG) memory. In an example embodiment, one or more of the circuits 92a-92n may comprise blocks (or circuits) 110a-110n. In the example shown, a block 110*a* and a block 110*b* are implemented. In an example, the circuit 110*a* may implement convolution operations. In another example, the circuit 110*b* may be configured to provide dot product operations. The convolution and dot product operations may be used to perform computer (or machine) vision tasks (e.g., as part of an object detection process). In yet another example, one or more of the circuits 92*c*-92*n* may comprise blocks (or circuits) 110*c*-110*n* (not shown) to provide convolution calculations in multiple dimensions. An example implementation of a convolution calculation scheme that may be used by one or more of the circuits 92*a*-92*n* may be found in co-pending U.S. application Ser. No. 15/403,540, filed Jan. 11, 2017, which is herein incorporated by reference in its entirety. The circuit 84 may be configured to receive directed acyclic graphs (DAGs) from the processor 82. The DAGs received from the processor 82 may be stored in the DAG memory 98. The circuit 84 may be configured to execute a DAG for the MS 100 using the circuits 90, 92*a*-92*n*, and 94.

Multiple signals (e.g., OP_A to OP N) may be exchanged between the circuit 90 and the respective circuits 92*a*-92*n*. Each signal OP_A to OP N may convey execution operation information and/or yield operation information. Multiple signals (e.g., MEM A to MEM_N) may be exchanged between the respective circuits 92*a*-92*n* and the circuit 94. The signals MEM A to MEM_N may carry data. A signal (e.g., DRAM) may be exchanged between the circuit 86 and the circuit 94. The signal DRAM may transfer data between the circuits 86 and 106 (e.g., on the memory bus 88).

The circuit 90 may implement a scheduler circuit. The scheduler circuit 90 is generally operational to schedule tasks among the circuits 92*a*-92*n* to perform a variety of computer vision related tasks as defined by the processor circuit 82. Individual tasks may be allocated by the scheduler circuit 90 to the circuits 92*a*-92*n*. The scheduler circuit 90 may allocate the individual tasks in response to parsing the directed acyclic graphs (DAGs) provided by the processor 82. The scheduler circuit 90 may time multiplex the tasks to the circuits 92*a*-92*n* based on the availability of the circuits 92*a*-92*n* to perform the work.

Each circuit 92*a*-92*n* may implement a processing resource (or hardware engine). The hardware engines 92*a*-92*n* are generally operational to perform specific processing tasks. The hardware engines 92*a*-92*n* may be implemented to include dedicated hardware circuits that are optimized for high-performance and low power consumption while performing the specific processing tasks. In some configurations, the hardware engines 92*a*-92*n* may operate in parallel and independent of each other. In other configurations, the hardware engines 92*a*-92*n* may operate collectively among each other to perform allocated tasks.

The hardware engines 92*a*-92*n* may be homogenous processing resources (e.g., all circuits 92*a*-92*n* may have the same capabilities) or heterogeneous processing resources (e.g., two or more circuits 92*a*-92*n* may have different capabilities). The hardware engines 92*a*-92*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 92*a*-92*n* may be implemented solely as hardware circuits. In some embodiments, the hardware engines 92*a*-92*n* may be implemented as generic engines that may be configured through circuit customization and/or software/firmware to operate as special purpose machines (or engines). In some embodiments, the hardware engines 92*a*-92*n* may instead be implemented as one or more instances or threads of program code executed on the processor 82 and/or one or more processors 84, including, but not limited to, a vector processor, a central processing unit (CPU), a digital signal processor (DSP), or a graphics processing unit (GPU). In some embodiments, one or more of the hardware engines 92*a*-92*n* may be selected for a particular process and/or thread by the scheduler 90. The scheduler 90 may be configured to assign the hardware engines 92*a*-92*n* to particular tasks in response to parsing the directed acyclic graphs stored in the DAG memory 98.

The circuit 94 may implement a shared memory circuit. The shared memory 94 may be configured to store data in response to input requests and/or present data in response to output requests (e.g., requests from the processor 82, the DRAM 86, the scheduler circuit 90 and/or the hardware engines 92*a*-92*n*). In an example, the shared memory circuit 94 may implement an on-chip memory for the computer vision processor 84. The shared memory 94 is generally operational to store all of or portions of the multidimensional arrays (or vectors) of input data elements and output data elements generated and/or utilized by the hardware engines 92*a*-92*n*. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the processor 84. The transfer path 96 is generally operational to move data from the scheduler circuit 90 to the shared memory 94. The transfer path 96 may also be operational to move data from the shared memory 94 to the scheduler circuit 90.

The processor 82 is shown communicating with the computer vision processor 84. The processor 82 may be configured as a controller for the computer vision processor 84. In some embodiments, the processor 82 may be configured to transfer instructions to the scheduler 90. For example, the processor 82 may provide one or more directed acyclic graphs to the scheduler 90 via the DAG memory 98. The scheduler 90 may initialize and/or configure the hardware engines 92*a*-92*n* in response to parsing the directed acyclic graphs. In some embodiments, the processor 82 may receive status information from the scheduler 90. For example, the scheduler 90 may provide a status information and/or readiness of outputs from the hardware engines 92*a*-92*n* to the processor 82 to enable the processor 82 to determine one or more next instructions to execute and/or decisions to make. In some embodiments, the processor 82 may be configured to communicate with the shared memory 94 (e.g., directly or through the scheduler 90, which receives data from the shared memory 94 via the path 96). The processor 82 may be configured to retrieve information from the shared memory 94 to make decisions. The instructions performed by the processor 82 in response to information from the computer vision processor 84 may be varied according to the design criteria of a particular implementation.

Figure 4:
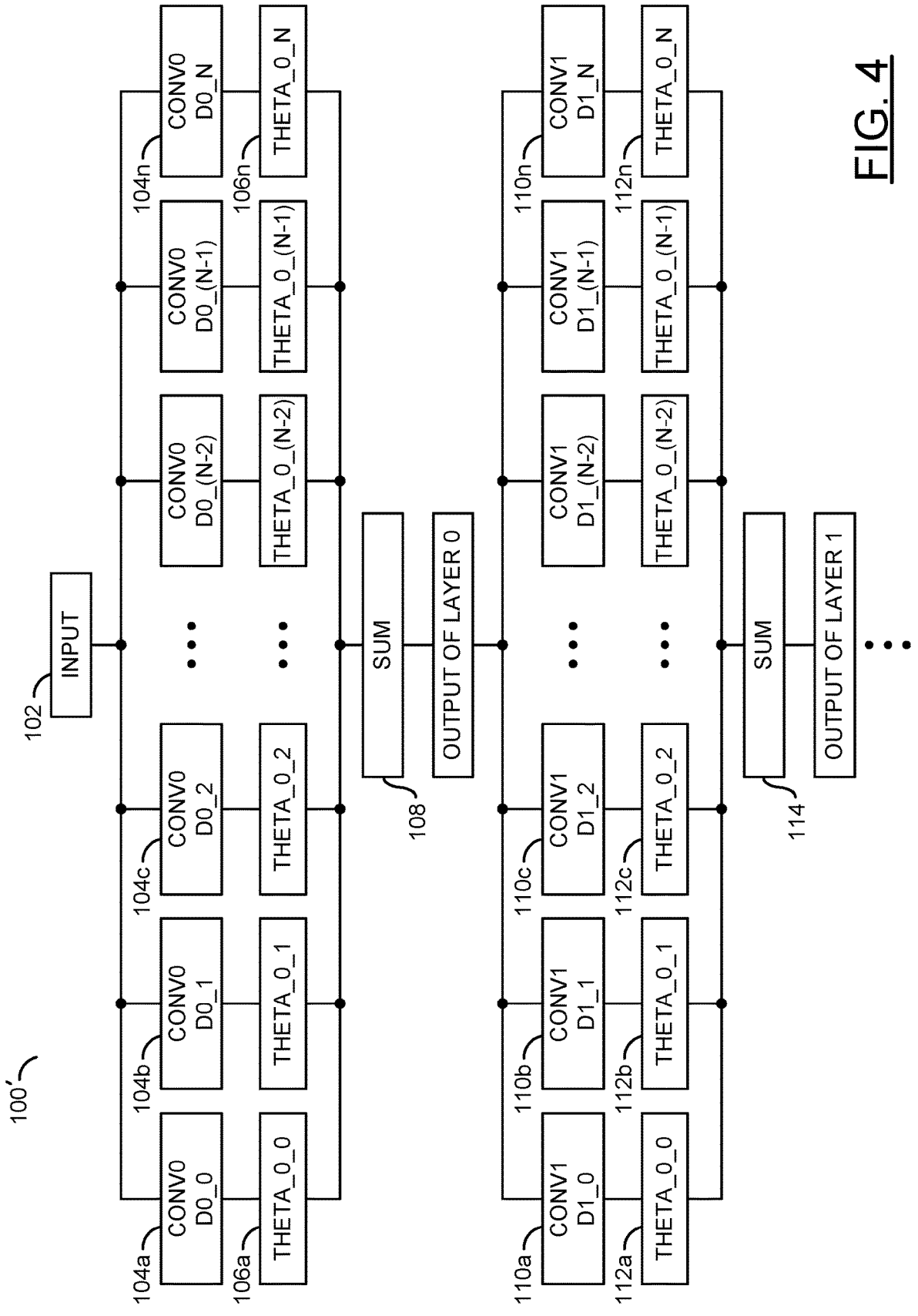
FIG. 4 is a diagram illustrating a portion of a stochastic super net representing a search space in accordance with example embodiments of the invention.

Referring to FIG. 4, a diagram is shown illustrating a portion of a stochastic super net 100' representing a search space utilized by a pruning technique in accordance with example embodiments of the invention. In various embodiments, pruning begins with a pre-trained model. The sparsity of the pre-trained model is assumed to be 0% (or fully dense). In an example, a layer-wise search space with a fixed macro-architecture may be constructed, where each layer may choose a different "block" from a plurality of candidate blocks, and each candidate block is a layer with a particular sparsity level. In various embodiments, the search space generally comprises a macro-architecture and variety of blocks corresponding to a particular edge device on which the sparsified network is to be run.

In various embodiments, the macro-architecture used is the structure of the pre-trained model with the same number of layers and the same input/output dimensions of each layer. The pruning algorithm generally focuses on kernel sparsification. Since the pruning algorithm focuses on kernel sparsification, pruning percentages for fully-connected layers and layers with convolutional operators may be searched. Layers without convolutional operators, for example, linear layers or pooling layers, may be fixed.

The search space is generally represented by the stochastic super net 100'. The super net 100' generally has the same macro-architecture as the pre-trained model. Each layer of the stochastic super net 100' generally contains a number (e.g., N) of parallel candidate blocks (e.g., 104a-104n for layer 0, 110a-110n for layer 1, etc.), corresponding distribution parameters 0 (e.g., 106a-106n for layer 0, 112a-112n for layer 1, etc.), and a summing (or pooling) block (e.g., 108 for layer 0, 114 for layer 1, etc.) providing a respective output of the layer. For a layer i of the macro-architecture super net 100', the N candidate blocks generally have the same operator (or activation function) as a corresponding layer i of the pre-trained model. Each candidate block (104a-104n, 110a-110n, etc.) generally has a different kernel sparsity (e.g., D0_0-D0_n for layer 0, D1_0-D1_n for layer 1, etc.). In an example, the candidate blocks (104a-104n, 110a-110n, etc.) may be configured with a range of kernel sparsity levels (e.g., 10%, 20%, 30%, . . . , 90%, 100%). In various embodiments, each layer may have a different range of kernel sparsity levels depending on the hardware resources of the particular edge device platform to be used. In an example, a first instance of a convolutional layer (layer 0) may be expanded to nine blocks with an acceptable density range of 11-100%. In another example, a second instance of a convolutional layer (layer 1) may be expanded to nine blocks with an acceptable density range of 60-100%. In an example, if the pre-trained model contains M convolutional layers in total, the overall search space generally contains M layers. Each layer of the search space may choose a respective block from N candidate blocks, so the search space contains M*N possible kernel sparsity levels. The objective is to find the optimal layer-wise block assignment (sparsity).

In an example, the pruning algorithm may be implemented utilizing a hardware-aware search technique. In an example, a search technique similar to FBNet may be utilized to optimize layer sparsity via a search of a search space comprising a plurality of layer sparsity candidates. A description of FBNet may be found in Wu, Bichen et al., FBNet: Hardware-Aware Efficient ConvNet Design via Differentiable Neural Architecture Search, arXiv: 1812.03443v3 [cs.CV] 24 May 2019. FBNet is a technique developed by researchers Facebook® and Berkeley at for designing hardware aware convolutional neural networks (ConvNets) via differentiable neural network search (DNAS). FBNet uses gradient-based methods to optimize ConvNet architectures avoiding enumerating and training individual separately as in previous reinforcement learning based methods (Mnasnet).

In the FBNet paper, each block represented a different architecture. The goal of the training process was to figure out which architecture block worked the best at each layer. The training process does so by assigning a probability value θ to each block. The sum of all the probability values θ in a layer is 1. In the approach in accordance with embodiments of the invention, the architecture is not varied. Instead, the objective is to determine a sparsity level that works best at particular layers. In various embodiments, the process in accordance with embodiments of the invention restricts the creation of parallel blocks to only the convolution and fully connected layers. The convolution and fully connected layers have weights/kernels that may be trained. A number of parallel convolution (or fully connected) blocks with different densities (1-sparsity) levels are created. The acceptable density range is also determined (e.g., based on the model and the target chip configuration).

When the sparsity of the neural network has been optimized, the optimized sparsified neural network 100 may be compiled to generate a program in a high-level language (rather than generic low-level operators) for execution on the particular embedded hardware of a particular edge device or devices. The compiled program, referred to as a directed acyclic graph (DAG) executable binary, may be executed on the particular hardware as the MS 100. The result of the execution may be validated and the sparsified super net 100' retrained as needed (e.g., using a data set of the customer).

As in the case of FBNet, a loss function used in training the macro-architecture 100' reflects not only the accuracy of a given sparsity level but also latency. In an example, the loss function may be expressed using the following Equation 1:

$$L(a, w_a) = CE(a, w_a) \cdot \alpha \ \log(LAT(a))^{\beta}. \qquad \text{EQ. 1}$$

The first term $CE(a, w_a)$ denotes the cross-entropy loss of sparsity level a with parameter $w_a$. The second term LAT(a) denotes the latency. The coefficient α controls the overall magnitude of the loss function. The exponent coefficient β modulates the magnitude of the latency term. The cross-entropy loss may be easily computed. A latency look up table may be created offline to estimate the overall latency of a network based on the number of multiply accumulate operations (or MAC count) of each operator. In an example,' the overall latency may be expressed by the following Equation 2:

$$LAT = \left(b_i^{(a)}\right) \sim O\!\left(M^2 \cdot K^2 \cdot C_{in} \cdot C_{out}\right), \qquad \text{EQ. 2}$$

where M refers to the output feature map size, K refers to kernel size, $C_{in}$ refers to input channel number, and $C_{out}$ refers to output channel number. It is generally assumed that the convolution (or fully connected) layers execute sequentially (e.g., there is no parallelism). The latency of the sparsity level may be expressed by the following Equation 3:

$$LAT(a) = \sum_{l} LAT(b_l^{(a)}), \qquad \text{EQ. 3}$$

where $b_1^{(a)}$ denotes the block at layer 1 with sparsity level a.

The way to find the optimal layer-wise pruning solution is to train the stochastic super net 100'. During training, in each epoch, the kernel/weight of each operator may be trained with 80% of a training dataset and the architecture distribution parameter θ may be trained on the remaining 20% of the training dataset.

During the inference of the super net 100', each candidate block may be sampled and executed with a probability summarized by the following Equation 4:

$$P_\theta(b_l = b_{l,i}) = \frac{\exp(\theta_{l,i})}{\sum_i \exp(\theta_{l,i})}. \qquad \text{EQ. 4}$$

The goal is to solve the following expression:

$$\min_{a \in A} \min_{w_a} E_{a \sim P_\theta} L(a, w_a),$$

which is to optimize the probability $P_\theta$ of the stochastic super net 100' to achieve the minimum expected loss. Because, the loss function is not directly differentiable to the sampling parameter, a continuous random mask variable $m_{l,i}$ may be applied by computing the Gumbel Softmax function $$m_{l,i} = GumbelSoftmax(\theta_{l,i} \mid \theta_l) = \frac{\exp((m_{l,i} + g_{l,i})/\tau)}{\sum_i ((\theta_{l,i} + g_{l,i})/\tau)},$$

where $g_{1,i}$~Gumbel (0, 1) is a random noise following the Gumbel distribution. Then the latency term may be expressed as the following Equation 5:

$$LAT(a) = \sum_l \sum_i m_{l,i} \cdot LAT(b_{l,i}), \qquad \text{EQ. 5}$$

allowing the overall latency of sparsity level to be differentiable with respect to the mask $m_{1,i}$, and therefore $\theta_{1,i}$.

Figure 5:
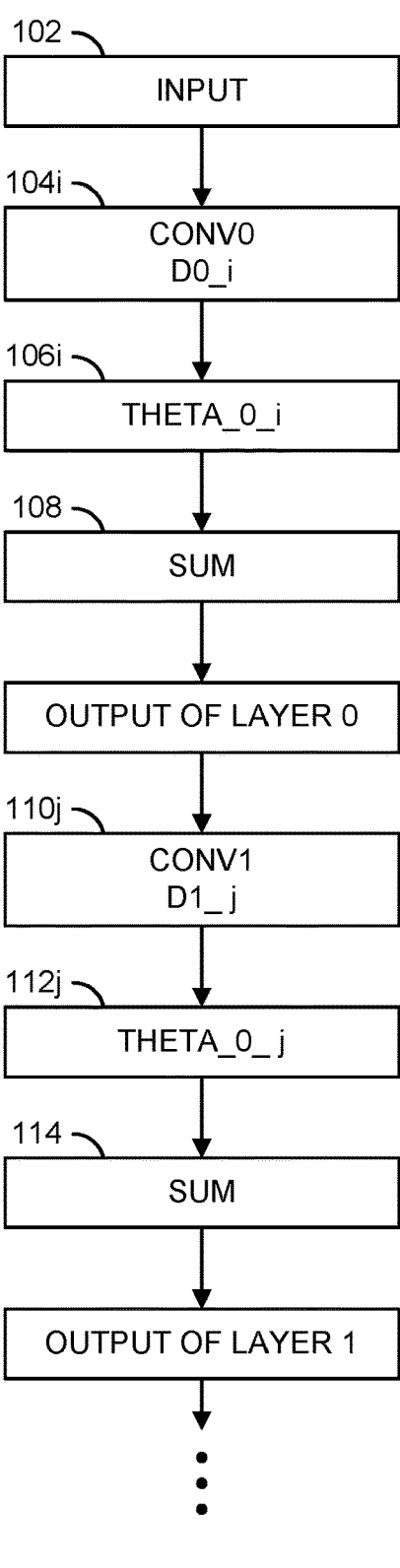
FIG. 5 is a diagram illustrating a portion of a sparsified neural network generated in accordance with an example embodiment of the invention.

Referring to FIG. 5, a diagram is shown illustrating a portion of an optimized sparsified neural network 100 generated by a pruning technique in accordance with an example embodiment of the invention. When the sparsity level of each layer of the super net 100' has been optimized, the result may be utilized as the optimized sparsified neural network 100. In an example, the optimized sparsified neural network 100 may comprise the input layer 102, a layer 0 comprising a convolution operator 1041 having sparsity D0_i, a corresponding distribution parameter 1061 with a value THETA_0_i, a summing (or pooling) layer 108 providing the respective output of the layer 0, a layer 1 comprising a convolution operator 110j having sparsity D1_j, a corresponding distribution parameter 112j with a value THETA_0_j, a summing (or pooling) layer 114 providing the respective output of the layer 11. The optimized sparsified neural network 100 may be compiled to generate a program in a high-level language (rather than generic low-level operators) for execution on the particular embedded hardware of a particular edge device or devices. In an example, the compiled program, referred to as a directed acyclic graph (DAG) executable binary, may be programmed into the particular hardware as the MS 100 and the associated weights WGTS 101.

Figure 6:
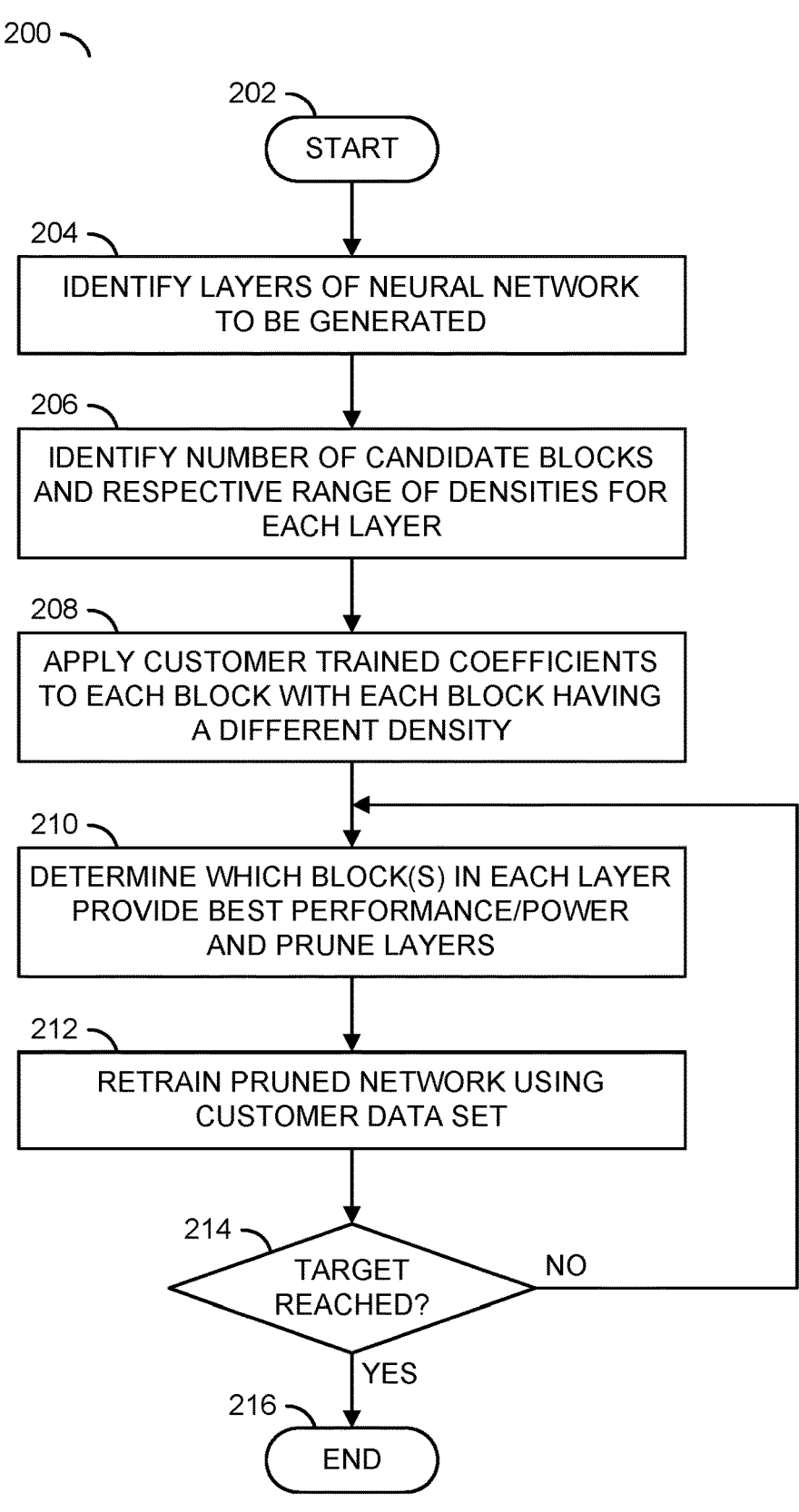
FIG. 6 is a flow diagram illustrating a process in accordance with example embodiments of the invention.

Referring to FIG. 6, a flow diagram is shown illustrating a sparsification process 200 in accordance with example embodiments of the invention. In an example, the process (or method) 200 may comprise a step (or state) 202, a step (or state) 204, a step (or state) 206, a step (or state) 208, a step (or state) 210, a step (or state) 212, a decision step (or state) 214, and a step (or state) 216. The process 200 may begin in the step 202 and move to the step 204. In the step 204, the process 200 may identify a number of layers of a neural network to be generated based on a neural network being pruned and move to the step 206. In the step 206, the process 200 may identify a number of candidate blocks with a range of densities for each layer in the sparsified neural network being generated. In an example, the creation of candidate blocks may be restricted to convolution and fully connected layers of the neural network being pruned. In the step 208, the process 200 applies customer trained coefficients from the neural network being pruned to each block with each block having a different density. In the step 210, the process 200 determines which block(s) in each layer provide the best performance and/or power, and prunes the layers. In the step 212, the process 200 retrains the pruned network using the training data set provided by the customer. In the decision step 214, the process 200 determines whether a target has been reached. If the target has been achieved, the process 200 move to the step 216 and ends. If the target has not been achieved, the process 200 returns to the step 210 to perform additional pruning.

Figure 7:
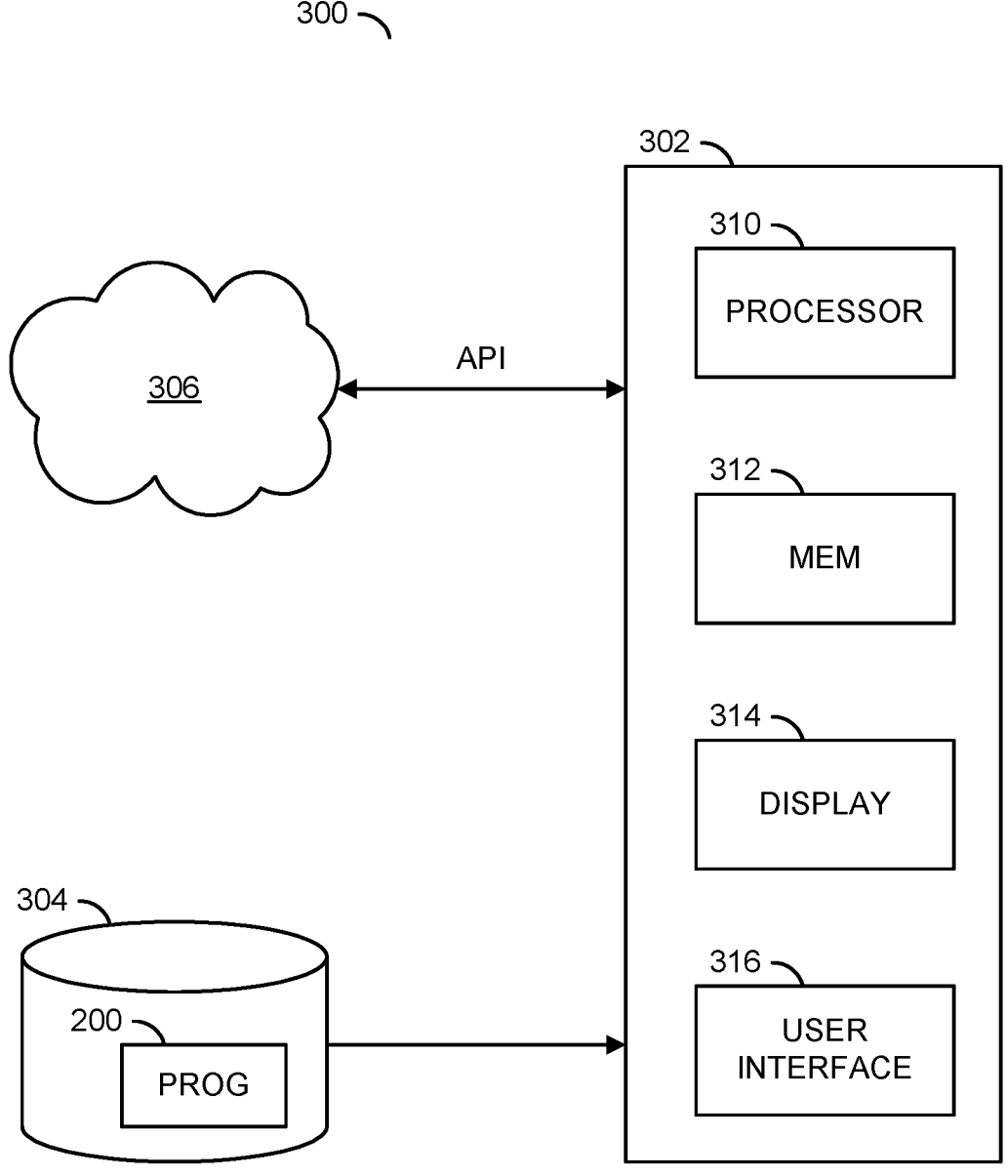
FIG. 7 is a diagram illustrating an example of a computer system in which the process of FIG. 6 may be implemented.

Referring to FIG. 7, a diagram is shown illustrating a context in which the process 200 of FIG. 6 may be implemented. In an example, a system 300 may be configured (e.g., through software) to perform the process 200 on a pre-trained neural network. In an example, the system 300 may comprise a computer 302 and a computer readable storage medium 304. In an example, the computer 302 may be implemented as a general purpose computer system. In an example, the computer readable storage medium 304 may include, but is not limited to, a magnetic storage medium (e.g., a hard disk drive or HDD), an optical storage medium (e.g., compact disc (CD), digital video disc (DVD), BluRay disc (BD), a solid state drive (SSD), and/or a network associated storage system (NAS). In an example, the computer 302 and the computer readable storage medium 304 may be coupled together to exchange programs and data. In an example, a program (or programs) implementing the process 200 may be stored on the computer readable storage medium 304 or in cloud based resources 306. In an example, the computer 302 may be further configured to perform the process 200 utilizing the cloud resources 306. In an example, the computer 302 may be configured to perform the process 200 via an application program interface (API).

In an example, the computer 302 may include, but is not limited to, a processor 310, memory 312, a display 314, and a user interface 316. In various embodiments, the processor 310 may include, but is not limited to, a central processing unit (CPU), a graphics processing unit (GPU), and a video processing unit (VPU). In various embodiments, the memory 312 may include, but is not limited to, random access memory (e.g., SRAM, DRAM, FLASH, etc.), read only memory (ROM), and cache memory. The display 314 and the user interface 316 generally allow a user to initiate and monitor the computer 302 performing the process 200.

Figure 8:
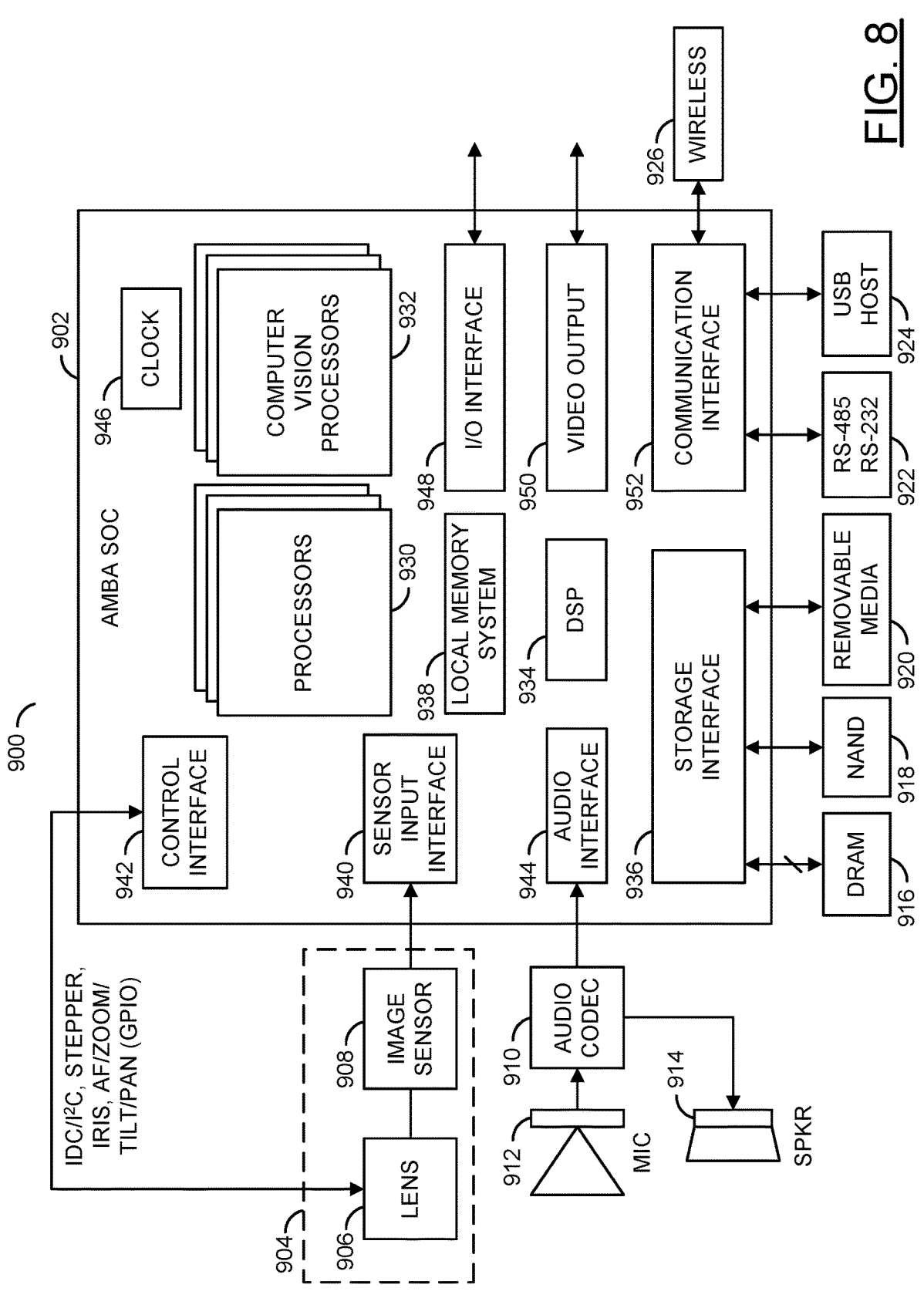
FIG. 8 is a diagram illustrating a context in which a sparsified neural network generated in accordance with example embodiments of the invention may be utilized.

Referring to FIG. 8, a diagram of a camera system 900 is shown illustrating an example implementation of a computer vision system in which a sparsified neural network generated in accordance with example embodiments of the invention may be utilized. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 6.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related processor circuits. In an example, one or more of the circuits 932 may implement a sparsified neural network generated in accordance with an example embodiment of the invention. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930. In response to the computer readable instructions, the processors 930 may be operational to operate as controllers for the processors 932. For example, the resources of the processors 932 may be configured to efficiently perform various specific operations in hardware and the processors 930 may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 components on-board the may be processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering. The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802. 15.4, IEEE 802. 15.5, and/or IEEE 802.20, GSM, CDMA, GPRS, UMTS, CDMA2000, 3GPP LTE, 4G/HSPA/WiMAX, 5G, LTE M, NB-IOT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, Z-Wave, LoRa, Wi-Fi IEEE ZigBee®, 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IOT, etc. The processor/camera circuit 902 may also include support for communication using one or more of the universal serial bus protocols (e.g., USB 1.0, 2.0, 3.0, etc.).

The functions performed by and structures illustrated in the diagrams of FIGS. 1 to 8 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of pruning a pre-trained neural network model utilizing kernel sparsification comprising the steps of: constructing a stochastic super net representing a layer-wise search space with a fixed macro-architecture, wherein
  (i) the fixed macro-architecture has a number of layers that match the number of layers of the pre-trained neural network model and each of the number of layers of the fixed macro-architecture has input/output dimensions that match the input/output dimensions of a corresponding layer of the pre-trained neural network model,
  (ii) each layer of the fixed macro-architecture comprises a plurality of candidate blocks,
  (iii) each of the plurality of candidate blocks of each layer of the fixed macro-architecture has (a) an architecture that matches the architecture of the corresponding layer of the pre-trained neural network model, (b) a respective kernel sparsity level that is different from the respective kernel sparsity levels of the other candidate blocks in the same layer of the fixed macro-architecture and (c) an operator that is the same as an activation function of the corresponding layer of the pre-trained neural network model, wherein the respective kernel sparsity level of each of the candidate blocks in each of the layers of the fixed macro-architecture represents a portion of coefficients removed in a respective kernel of each of the plurality of candidate blocks in each of the layers of the fixed macro-architecture relative to the corresponding layer of the pre-trained neural network model;
training the stochastic super net, using a training dataset used to train the pre-trained neural network model; and
generating a pruned version of the pre-trained neural network model by determining a particular candidate block selection in each of the layers of the fixed macro-architecture that provides an optimal level of kernel sparsity for each layer of the pruned version of the pre-trained neural network model based upon a cost function, wherein the pruned version of the pre-trained neural network is compiled using a plurality of dedicated hardware engines to enable an execution of a directed acyclic graph on predetermined hardware of an edge device.

2. The method according to claim 1, wherein different layers of said pruned version of the pre-trained neural network model are sparsified to different levels of kernel sparsity.

3. The method according to claim 1, wherein said method generates a sparsified neural network via a differentiable neural network search.

4. The method according to claim 1, further comprising the step of
  creating a latency lookup table offline to estimate an overall latency of a network based on a number of multiply accumulate operations of each operator, wherein (i) said cost function includes a first term denoting a cross-entropy loss of the respective kernel sparsity level and a second term denoting a latency of the respective kernel sparsity level and (ii) said latency of said second term of said cost function is determined in response to a summation of said overall latency of each of said layers at said respective kernel sparsity level.

5. The method according to claim 4, wherein said second term denoting the latency of the respective kernel sparsity level accounts for performance on said predetermined hardware of said edge device.

6. The method according to wherein the respective kernel sparsity levels of the plurality of candidate blocks of each respective layer of the fixed macro-architecture are configured to cover a respective range of kernel sparsity levels for the respective layer in response to both (a) hardware resources and (b) a model and configuration of a chip of said predetermined hardware of said edge device.

7. The method according to wherein said step of training the stochastic super net comprises a plurality of epochs, and in each epoch a kernel or weight of an operator of each of the plurality of candidate blocks is trained with 80% of said training dataset and an architecture distribution parameter of each of the plurality of candidate blocks is trained on a remaining 20% of said training dataset.

8. The method according to claim 1, wherein only layers with convolutional operators are pruned utilizing kernel sparsification.

9. The method according to claim 1, wherein fully connected layers and layers with convolutional operators are pruned utilizing kernel sparsification.

10. An apparatus comprising:

a camera configured to capture a sequence of images; and a processing circuit configured to perform a computer vision operation on said sequen of images utilizing a sparsified neural network, wherein (A) said sparsified neural network is generated by (a) constructing a stochastic super net representing a layer-wise search space with a fixed macro-architecture, where (i) the fixed macro-architecture has a number of layers that match a number of layers of a full density pre-trained neural network model and each of the number of layers of the fixed macro-architecture has input/output dimensions that match the input/output dimensions of a corresponding layer of the full density pre-trained neural network model, (ii) each layer of the fixed macro-architecture comprises a plurality of candidate blocks, (iii) each of the plurality of candidate blocks of each layer of the fixed macro-architecture has (a) an architecture that matches the architecture of the corresponding layer of the full density pre-trained neural network model, (b) a respective kernel sparsity level that is different from the respective kernel sparsity levels of the other candidate blocks in the same layer of the fixed macro-architecture and (c) an operator that is the same as an activation function of the corresponding layer of the pre-trained neural network model, wherein the respective kernel sparsity level of each of the candidate blocks in each of the layers of the fixed macro-architecture represents a portion of coefficients removed in a respective kernel of each of the plurality of candidate blocks in each of the layers of the fixed macro-architecture relative to the corresponding layer of the full density pre-trained neural network model, (b) training the stochastic super net, using a training dataset used to train the full density pre-trained neural network model, and (c) determining a layer-wise candidate block assignment that provides an optimal level of kernel sparsity for each layer of the sparsified neural network based upon a cost function, (B) said processing circuit comprises a plurality of dedicated hardware engines, and (C) said layer-wise candidate block assignment of said sparsified neural network is compiled using said plurality of dedicated hardware engines to enable execution of a directed acyclic graph on predetermined hardware of an edge device.

11. The method according to claim 1, wherein (i) a creation of parallel blocks is restricted to convolution layers and fully connected layers of said of said fixed macro-architecture and (ii) densities of said parallel blocks are determined according to an acceptable density range based on both (a) hardware resources and (b) a model and configuration of a chip of said predetermined hardware of said edge device.

12. The apparatus according to claim 11, wherein said apparatus implements said edge device.

13. The apparatus according to claim 10, wherein said camera is implemented as at least one of a traffic camera, an automatic number plate recognition camera, a dome camera, a bullet camera, an automatic teller machine camera, an access control camera, a vehicle camera, a doorbell camera, a battery-powered camera, an indoor camera, and an outdoor camera.

14. The apparatus according to claim 10, wherein said sparsified neural network is configured for one or more of feature detection, feature recognition, object detection, multi-object detection, object recognition, and face recognition.

15. A non-transitory computer readable storage medium embodying computer executable instructions, which when executed cause a computer to perform a method of pruning a pre-trained neural network model utilizing kernel sparsification comprising the steps of:

constructing a stochastic super net representing a layer-wise search space with a fixed macro-architecture, wherein (i) the fixed macro-architecture has a number of layers that match the number of layers of the pre-trained neural network model and each of the number of layers of the fixed macro-architecture has input/output dimensions that match the input/output dimensions of a corresponding layer of the pre-trained neural network model, (ii) each layer of the fixed macro-architecture comprises a plurality of candidate blocks, (iii) each of the plurality of candidate blocks of each layer of the fixed macro-architecture has (a) an architecture that matches the architecture of the corresponding layer of the pre-trained neural network model, (b) a respective kernel sparsity level that is different from the respective kernel sparsity levels of the other candidate blocks in the same layer of the fixed macro-architecture and (c) an operator that is the same as an activation function of the corresponding layer of the pre-trained neural network model, wherein the respective kernel sparsity level of each of the candidate blocks in each of the layers of the fixed macro-architecture represents a portion of coefficients removed in a respective kernel of each of the plurality of candidate blocks in each of the layers of the fixed macro-architecture relative to the corresponding layer of the pre-trained neural network model;

training the stochastic super net, using a training dataset used to train the pre-trained neural network model; and generating a pruned version of the pre-trained neural network model by determining a layer-wise candidate block assignment that provides an optimal level of kernel sparsity for each layer of the pruned version of the pre-trained neural network model based upon a cost function, wherein the pruned version of the pre-trained neural network is compiled using a plurality of dedicated hardware engines to enable execution of a directed acyclic graph on predetermined hardware of an edge device.

16. The non-transitory computer readable storage medium according to claim 15, wherein said computer executable instructions provide flexibility to sparsify different layers to different levels of kernel sparsity.

17. The non-transitory computer readable storage medium according to claim 15, wherein said computer executable instructions generate a sparsified neural network via a differentiable neural network search.

18. The non-transitory computer readable storage medium according to claim 15, wherein said cost function includes a latency term that accounts for performance on said predetermined hardware of said edge device.

19. The non-transitory computer readable storage medium according to claim 15, wherein said step of training the stochastic super net comprises a plurality of epochs, and in each epoch a kernel or weight of an operator of each of the plurality of candidate blocks is trained with a first portion of said training dataset and an architecture distribution parameter of each of the plurality of candidate blocks is trained on a second portion of said training dataset.

20. The non-transitory computer readable storage medium according to claim 15, wherein said step of generating a pruned version of the pre-trained neural network model comprises one or more of pruning each of said layers utilizing kernel sparsification, pruning only layers with convolutional operators utilizing kernel sparsification, or pruning only fully connected layers and layers with convolutional operators utilizing kernel sparsification.

\* \* \* \* \*